June 27, 1967  W. RIZK ET AL  3,327,476
TURBINE DUCT MOUNTING INSTALLATION
Filed Sept. 16, 1965  2 Sheets-Sheet 2
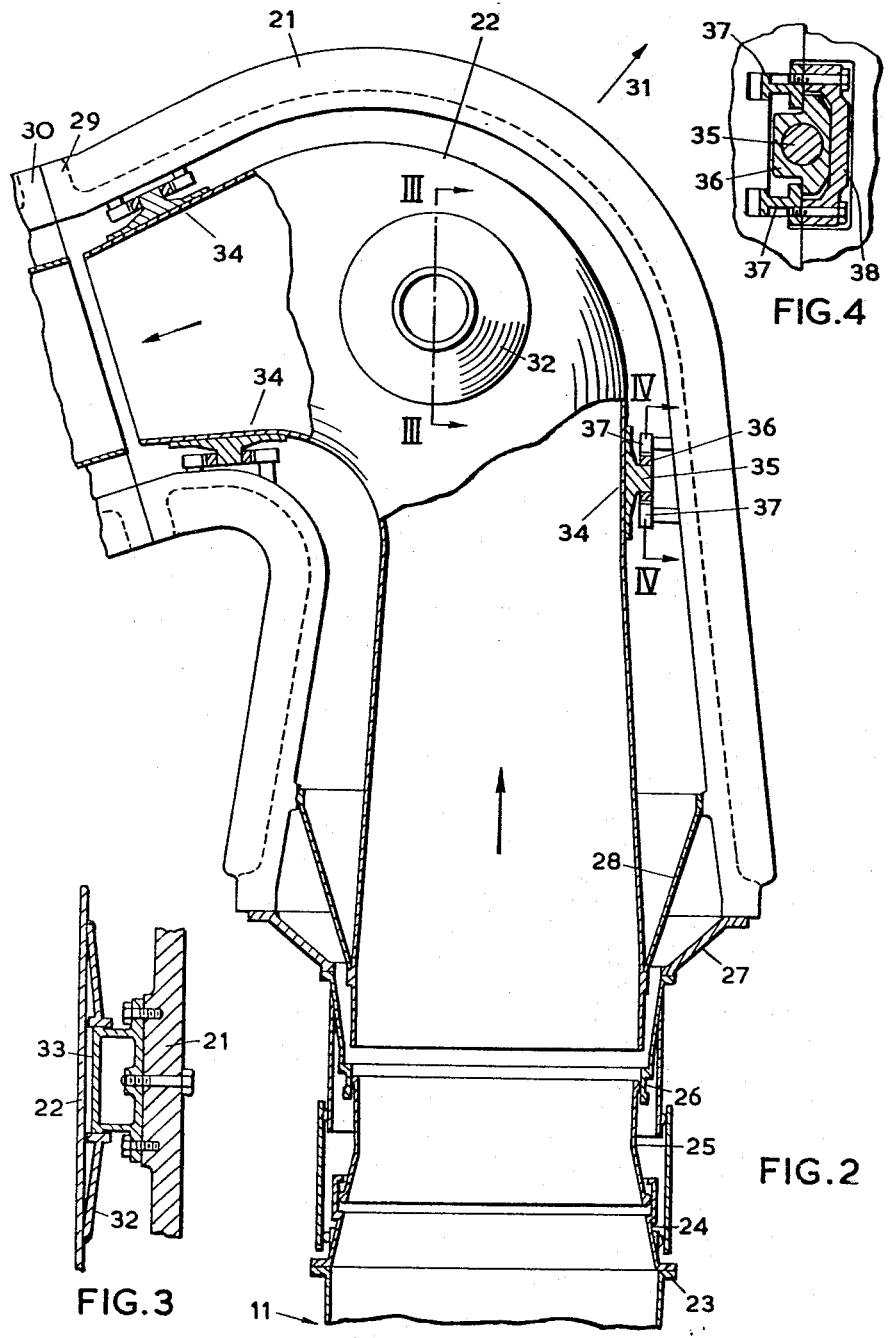

United States Patent Office 3,327,476
Patented June 27, 1967

3,327,476
TURBINE DUCT MOUNTING INSTALLATION
Waheeb Rizk and Roy Bolesworth, both of Whetstone, England, assignors to The English Electric Company Limited, London, England, a British company
Filed Sept. 16, 1965, Ser. No. 487,762
Claims priority, application Great Britain, Sept. 24, 1964, 38,975/64
3 Claims. (Cl. 60—39.31)

This invention relates to turbine installations.

In a turbine installation including a power turbine which is driven by gas from a gas-producer unit, for example from the exhaust of a gas-turbine engine of the well-known open-cycle type, it is necessary to provide duct means between the gas-producer unit and the power turbine. The part of the duct means through which the gas flows is heated in operation to a high temperature, and it is necessary both to ensure that this part of the duct means remains correctly aligned with the outlet of the gas-producer unit and with the inlet of the power turbine, and also to provide for its thermal expansion relative to the part by which it is supported. This presents considerable difficulty if high stresses in the parts are to be avoided, especially where the duct means is curved and is therefore subject to asymmetric loading. A further requirement is that the duct means must contain the pressure of the gas therein, which is substantially greater than atmospheric pressure.

Accordingly it is an object of the present invention to provide, in a turbine installation including a power turbine and a gas-producer unit to feed gas to the power turbine, duct means and supporting and locating means therefor, which ensure correct alignment of the part of the duct means through which the gas flows and allow for thermal expansion thereof.

One embodiment of the invention will now be described by way of example with reference to the accompanying drawings of which:

FIG. 2 is a sectional view of part of FIG. 1, on a larger scale,

FIG. 3 is a section on the line III—III of FIG. 2, and
FIG. 4 is a section on the line IV—IV of FIG. 2.

Figure 1:
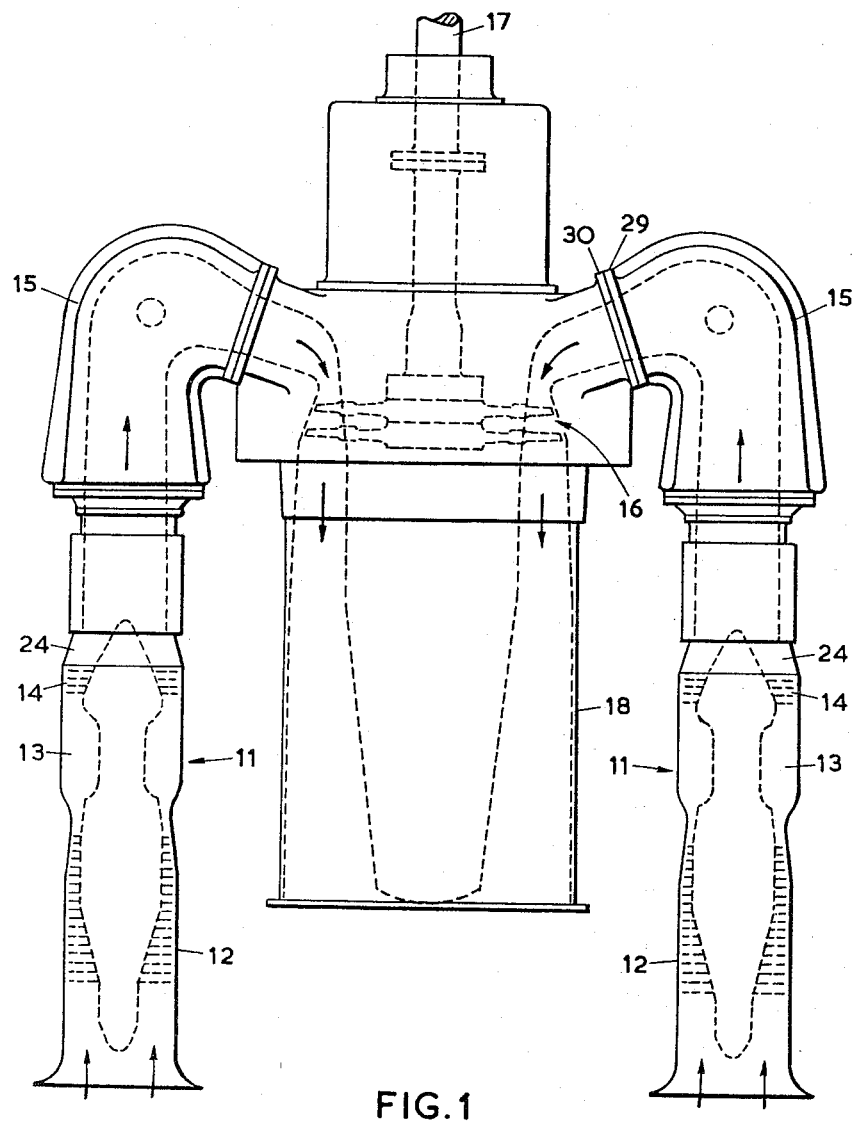
FIG. 1 is a diagrammatic plan view of a turbine installation.

Referring to FIG. 1 of the drawings, there is shown a turbine installation in which the exhaust gases of a pair of gas turbine engines drive a power turbine, the output from which is used to drive an electric alternator. Each of the gas turbine engines 11 is shown as being of the simple open-cycle type, having a compressor 12 into which air is drawn from atmosphere, compressed and passed to a combustion chamber 13 where fuel is burnt in it, the products of combustion driving a turbine 14 which is connected to the compressor 12 to drive it.

The exhaust gases from the gas turbine engines 11 still contain considerable energy and are led through ducts 15 to a power turbine 16 which is connected through a shaft 17 to an alternator (not shown) to drive it. The exhaust gases from the power turbine 16 flow to atmosphere through an exhaust duct 18.

In order to provide a compact installation, the gas turbine engines 11 are arranged alongside the exhaust duct 18 and have their axes parallel to the rotational axis of the power turbine 16.

Referring to FIG. 2, each of the ducts 15 has an outer casing 21 made in two parts divided on the horizontal centre-line (on which the section is taken), and an inner casing 22 through which the gas flows. The pressures on each side of the inner casing 22 are substantially equal and have a high value which depends on the expansion ratio of the power turbine 16. The pressure is contained by the outer casing 21, the exterior of which is at atmospheric pressure; the outer casing 21 is thus subjected to a bursting force.

Moreover, it will be seen that the exhaust gases are turned through an angle of approximately 120° in the duct 15, and the inner casing 22 is stressed as a result of the change of the direction of flow of the gases, which have a high velocity.

The outer casing 21 is connected to the turbine flange 23 of the gas turbine engine 11 through an arrangement allowing relative axial expansion of the duct and the gas turbine engine. Jointed to the turbine flange 23 is an exhaust cone 24 having an annular recess at its downstream end which receives a flange on the end of a sleeve 25; the other end of the sleeve 25 slides within a thin-section member 26 which is attached through an intermediate-section member 27 to the outer casing 21, which is of relatively thick section. The upstream end of the inner casing 22 is aligned with the sleeve 25, and is supported concentrically within the outer casing 21 by means of a frusto-conical member 28 welded to the inner casing and resting at its outer diameter on facings formed on the outer casing 21.

The use of the minimum thickness for the part of member 26 between its end flanges reduces the conduction of heat from the parts, i.e. exhaust cone 24 and sleeve 25, which are in direct contact with the high-velocity exhaust gas stream, to the relatively cool outer casing 21. Blankets of thermally-insulting material such as rock wool (omitted for clarity) are secured to substantially the entire inner surface of the outer casing 21 to reduce the heat input to the casing, and similar blankets are secured around the frusto-conical member 28 and fill the space betwen the upstream end of the inner casing 22 and the thin-section member 26. The latter is also surrounded by a cylindrical heat shield.

The downstream end of the outer casing 21 is formed with a flange 29 which is bolted to a corresponding flange 30 surrounding an inlet trunk, of which there is one on each side of the casing of the power turbine 16 to receive the exhaust gas from the corresponding gas turbine engine 11.

The approximate direction of the force acting on the inner casing 22, as a result of the angle through which the gases are turned in the duct 15, is indicated at 31.

The inner casing 22 is located against horizontal translational movement (i.e. movement in the plane of the paper) relative to the outer casing 21 by means of an annular part 32 (FIG. 3), welded to the inner casing 22, which surrounds and engages a circular part 33 which is secured, on assembly, to the outer casing 21.

Locating means identical with 32, 33 may also be provided below the inner casing 22, and in this case the upper and lower locating means will be vertically aligned.

On assembly (considering the upper locating means) the circular part 33 is first inserted in the socket in part 32 welded to the inner casing 22, when the latter is in position, and the top half of outer casing 21 is then placed over so that its flanges mate with those of the lower half, in a horizontal plane. A setscrew is then inserted through a clearance hole in the top half outer casing 21 and is engaged with a central threaded bore in part 33. It will be understood that, owing to manufacturing tolerances, especially in welding part 32 to the inner casing 22, the setscrew may not be in the centre of the clearance hole. With the outer and inner casing 21, 22 in the correct relative positions, the setscrew is tightened to clamp the circular part 33 to the outer casing 21.

The outer casing 21 is then removed, and is drilled and tapped to receive the setscrews which secure the part 33 to it. The part 33 may also be located relative to the outer casing 21 by a dowel pin.

After the part 33 has been secured to the outer casing 21 in this manner, the central setscrew may be removed and the hole in the outer casing plugged. When the outer casing 21 is placed over the inner casing 22 in the correct position for the horizontal flanges to mate the circular part 33 will, by this method, be exactly positioned to fit into the socket in the annular part 32.

If similar locating means are also provided below the inner casing, a similar method of assembly may be employed.

The inner casing 22 is supported in the outer casing, and locating against vertical movement, by means of three identical fittings 34 (FIGS. 2 and 4), each of which comprises a trunnion 35 welded to the inner casing 22 and engaging in a trunnion housing 36 which is held against members 37, secured to the outer casing 21, by means of cap members 38. The trunnions 35 are thus located against vertical movement. It will be apparent that the trunnion housings 36 can move horizontally relative to the members 37, 38.

What we claim as our invention and desire to secure by Letters Patent is:

1. In a turbine installation including a turbine housing, a shaft rotatably mounted within said turbine housing and a power turbine secured to said shaft; said power turbine having an inlet and an outlet side and said turbine housing having inlet means on the inlet side of said power turbine and outlet means on the outlet side of said power turbine; gas producer means having an inlet side and an outlet side; and duct means connected between the outlet side of said gas producer means and the inlet means of said turbine housing;
   (i) said duct means being curved;
   (ii) said duct means comprising an inner casing and an outer casing, the outer casing forming the pressure-containing wall of said duct means;
   (iii) a plurality of support means, each comprising a cylindrical trunnion secured to one of said casings and a trunnion housing mounted on the other of said casings, the trunnion housing being formed with a cylindrical hole in which said trunnion is engaged with freedom for movement axially of said hole, said trunnion housing of each of said plurality of support means being free to move in the plane containing the longitudinal axes of each of said trunnions; and
   (iv) locating means including a part secured to one of said casings and formed with a circular recess, and a second part secured to the other of said casings and having a cylindrical portion engaged in said circular recess, the axis of said cylindrical portion being transverse to the above-mentioned plane.

2. In a turbine installation the improvement as claimed in claim 1 further comprising said duct means being curved through an angle greater than a right angle.

3. In a turbine installation including a turbine housing, a shaft rotatably mounted within said turbine housing and a power turbine secured to said shaft; said power turbine having an inlet and an outlet side and said turbine housing having inlet means on the inlet side of said power turbine and outlet means on the outlet side of said power turbine; gas producer means having an inlet side and an outlet side; and duct means connected between the outlet side of said gas producer means and the inlet means of said turbine housing;
   (i) said duct means being curved;
   (ii) said duct means comprising an inner casing and an outer casing, the outer casing forming the pressure-containing wall of said duct means;
   (iii) a plurality of support means to support said inner casing within said outer casing, said support means being arranged in a single plane, to allow relative translational movement between said inner and outer casings in any sense in said plane but to prevent relative translational movement between said inner and outer casings transverse to said plane, each said support means comprising trunnion means secured to one of said casings and trunnion housing means mounted on the other of said casings, said trunnion housing means being formed with a hole having its axis in said plane and in which said trunnion means is engaged with freedom for movement along said axis, and said trunnion housing means of each of said plurality of support means being free for translational movement in said plane relative to the casing on which it is mounted, and
   (iv) locating means including a first part secured to one of said casings and a second part secured to the other of said casings, said first and second parts being capable of relative movement along a line transverse to the above-mentioned plane but being prevented from relative movement transverse to said line.

References Cited

UNITED STATES PATENTS 2,919,888   1/1960   Simmons _____ 60—39.32 X

MARK NEWMAN, *Primary Examiner.*

RALPH D. BLAKESLEE, *Examiner.*